United States Patent [19]

Woods

[11] Patent Number: 4,816,954

[45] Date of Patent: Mar. 28, 1989

[54] BLOCKING SWITCH FOR COMPUTER DISKETTES

[76] Inventor: Marquis A. Woods, 2444 Westbrook Rd., Elmwood Park, Ill. 60635

[21] Appl. No.: 82,683

[22] Filed: Aug. 7, 1987

[51] Int. Cl.⁴ .............................................. G11B 23/04
[52] U.S. Cl. ....................................... 360/133; 360/60
[58] Field of Search ........................... 360/60, 132, 133

[56] References Cited

U.S. PATENT DOCUMENTS

| | | | |
|---|---|---|---|
| 3,416,150 | 12/1968 | Lindberg | 360/133 X |
| 4,409,630 | 10/1983 | Saito | 360/133 X |
| 4,618,060 | 10/1986 | Tarter | 360/133 X |
| 4,649,452 | 3/1987 | Brugman | 360/133 |

Primary Examiner—John H. Wolff
Attorney, Agent, or Firm—Tilton, Fallon, Lungmus & Chestnut

[57] ABSTRACT

A slidable insert for blocking the disk write arm notch of diskettes used in computers comprises an elongate insert position for sliding movement in the edge portion of the envelope of a diskette to block the right protection notch thereof so that the read-write-erase function of the computers are prevented from operation, so that accidental erasure or writing over of previously stored information will not occur. The slidable insert is pushed in one direction to block the notch, and push in an opposite direction to unblock the notch with engaging tab portions extending through the envelope of the diskette for grasping.

5 Claims, 2 Drawing Sheets

BLOCKING SWITCH FOR COMPUTER DISKETTES

BACKGROUND OF THE INVENTION

1. Field of the Invention

This invention relates to new and useful improvements in diskettes for computers or word processors or the like and more particularly to diskettes having write-protection mechanisms.

2. Brief Description of the Prior Art

Computers use diskettes or small recording disks for magnetically recording information or for transferring information to or from the computer or word processor. The diskettes have a notch in on side to which the disk drive switch arm must fall to energize the "write to disk" functions before introduction of information onto the recording disk of the diskette can be commenced. The notch may be closed to restrict computer operation to "read only". The purpose of the present invention is to provide an apparatus that closes the notch to restrict computer operation to "read only".

The prior art discloses a variety of controls for magnetic diskettes, but does not solve the problem of write protection in the facile and simple manner of the present invention.

Diskettes have been provided with write protection by means of tape supplied over the notch. This tends to be cumbersome and not adjustable in use.

Bauers, U.S. Pat. No. 4,120,012 discloses a novel door mechanism and its relation to the diskette in a computer or word processor.

Rein, U.S. Pat. No. 4,188,650 disclosed a computer or word processor with a diskette slot provided with an auxiliary disk which is rotated to a position providing write protection.

Hatch, et al. U.S. Pat. No. 4,185,314 discloses an ejection mechanism for a record disk.

Vogt, U.S. Pat. No. 4,320,430 discloses a cartridge closure mechanism for a recording disk.

Fann, U.S. Pat. No. 4,521,820 discloses an external blocking means for the disk write switch.

Sofer, U.S. Pat. Nos. 2,487,900; Kubik, 3,068,442 and Heidecker, 3,959,823 disclose various mechanisms having control tabs, but none which is relevant to computer diskettes.

SUMMARY OF THE INVENTION

Diskettes used for recording in computers have a side switch arm notch to which the computer switch arm must fall before writing to the diskette can take place. It has been the custom to cover this switch arm notch when writing to the diskette is not desired. Since prerecorded information on a diskette may be accidentally written over and erased if the switch notch is left open, many users of diskettes cover the side notch with an adhesive strip such as tape when it is used in the read-only mode.

According to the invention, a thin, flexible, slidable insert is provided which may be inserted within the envelope holding the diskette which can be moved to close the diskette switch notch or slot when it is not desired that recording or editing be accomplished. The diskettes have thin circular plastic disks which are coated with ferromagnetic material and which are supplied in protective envelope covers, and said thin strip insert is designed to slide within said envelope in order to block the switch slot quickly and reliably.

An alternate embodiment of the present invention provides guiding means and a slidable insert therein both positioned externally of the envelope holding the diskette. The insert can be moved to close the diskette switch notch.

DESCRIPTION OF THE PREFERRED EMBODIMENTS

Figure 1:
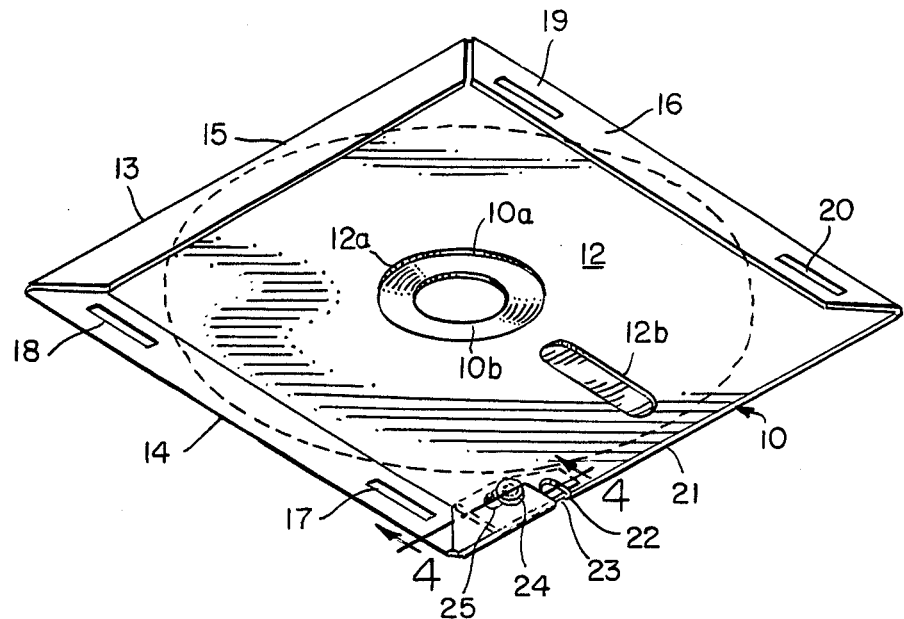
FIG. 1 is an isometric view of a computer diskette incorporating a preferred embodiment of this invention.

As shown in FIG. 1 a computer or word processor diskette 10 is shown which includes an envelope having a top layer 11 and a back layer 12. The back layer 12 and top layer 11 are joined along a fold 13. The back layer 12 has edge flaps 14, 15 and 16 which are folded over the edges of the back layer 12, as shown. The flaps 14–16 are bonded to the back layer 11 at areas 17, 18, 19 and 20.

Figure 2:
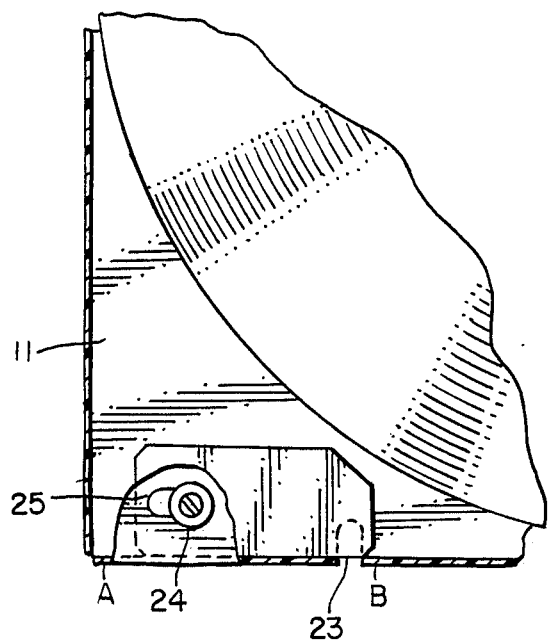
FIG. 2 is a top plane partial view showing the slidable insert blocking the switch notch of the envelope containing the computer diskette.

The bent edge 21 has no edge flaps and no bonding areas. A notch 22 of diskette 10 may be closed by the inserted element 23 by sliding movement from position A to position B as shown in FIG. 2. The sliding movement of insert 23 disposed through notch 22 can be engaged by pushing tab 24 disposed within slot 25 integrally connected to insert 23 towards position B for write-protection. When recording on the diskette is desired, insert 23 may be displaced from notch 22 by one engaging tab 24 and sliding it towards point A.

As shown in FIG. 1, diskette has therewithin a recording disk 10a of circular shape, coated with ferromagnetic material, which has a central circular opening 10b to be engaged by the disk drive. Back layer 12 and top layer 11 of the envelope have somewhat larger circular concentric openings 11a (not shown) and 12a. Back layer 12 and front layer 11 also have slot openings 11b (not shown) and 12b through which the recording head of the computer may engage the recording disk 10a. Slots 11b (not shown) and 12b may be at any location and have any size desired consistent with the disk drive operation.

Figure 3:
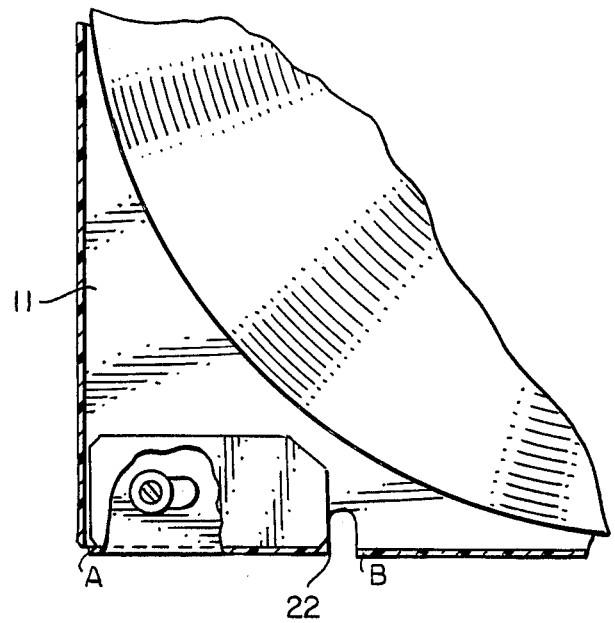
FIG. 3 is a top plane partial view showing the slidable insert in an open position.

It will be understood that when the diskette 10 is inserted into the disk drive, edge 21 is inserted first. Notch 22 may be closed with the insert 23 for write-protection, or can be opened for recording. FIGS. 2 and 3 show these respective positions.

Figure 4:
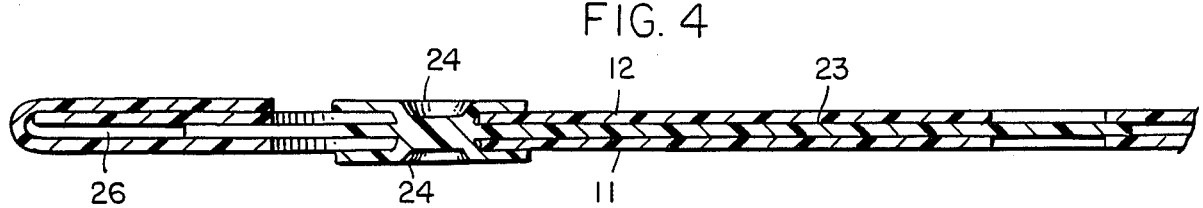
FIG. 4 is a cross-sectional view taken from lines 4—4 FIG. 1.

FIG. 4 shows a cross-section taken at lines 4—4 of FIG. 1 showing the closed position of the insert 23.

Tabs 24 are shown integrally connected to insert 23 and extending through either side of diskette 10. Note that insert 23 glides in space 26 within bent edge 21. Space 26 is interposed between back layer 12 and top layer 11.

Figure 5:
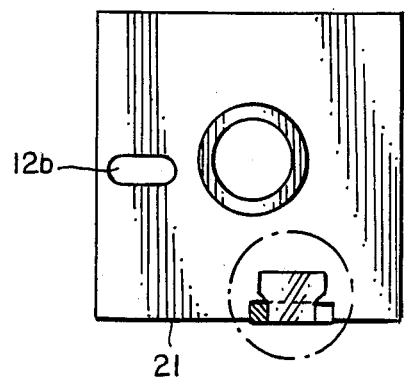
FIG. 5 is an isometric view of a computer diskette incorporating an alternate embodiment of this invention.

An alternate embodiment is shown in FIG. 5 whereas diskette 10 is shown in an envelope without edge flaps 14–16.

Tab 30 is shown adjacent edge 21 and within guiding means 31. Tab 30 is positioned to slide over notch 22 for blocking purposes. Both tab 30 and guilding means 31 are mounted externally on the envelope near slot 22. Guilding means 31 overlaps edge 21 from the top layer to bottom layer 12. Guiding means 31 may preferably be constructed of clear plastic material for facile handling and viewing of tab 30. Tab 30 is shown with notch 22 in the open position of FIG. 6. Tab 30 is moved in the direction of the arrow in FIG. 7 for blocking or closing of notch 22 for write protection.

Figure 6:
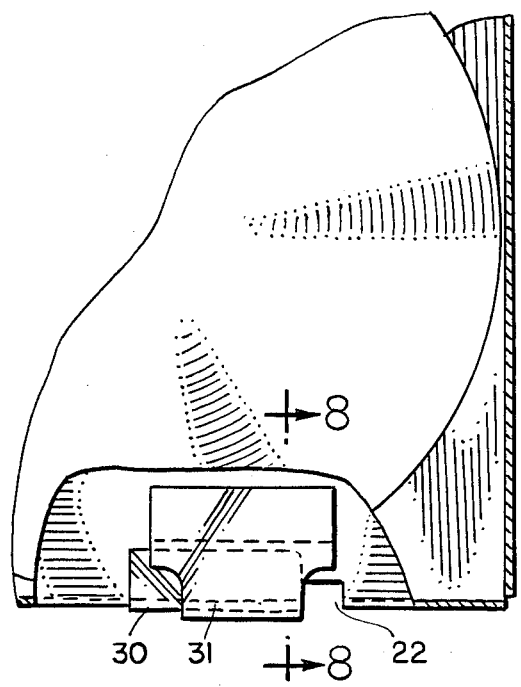
FIG. 6 is a top plane partial view showing the slidable insert in an open position.
Figure 7:
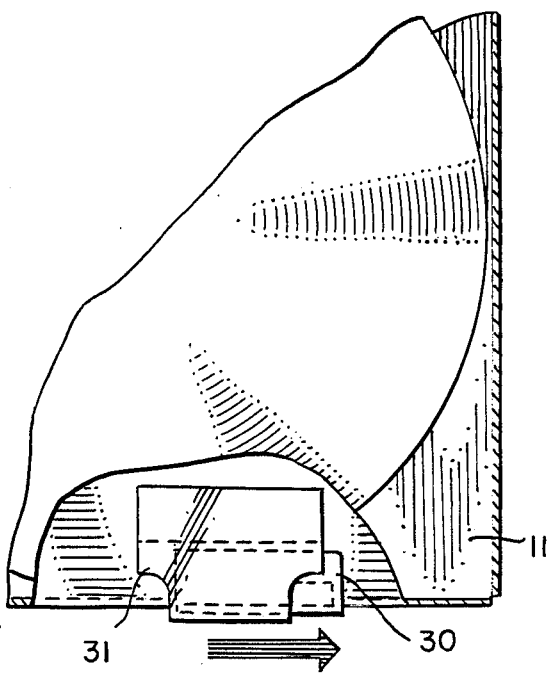
FIG. 7 is a top plane partial view showing the slidable insert blocking the switch notch of the envelope containing the computer diskette.
Figure 8:
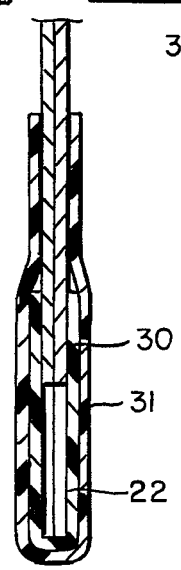
FIG. 8 is a cross-sectional view taken from line 8—8 of FIG. 6.

FIG. 8 shows a cross-section taken at line 8—8 of FIG. 6 showing the open position of tab 30 over notch 22.

Although but one specific embodiment of this invention is herein shown and described, it will be understood that details of the construction shown may be altered or omitted without departing from the spirit of the scope as defined by the following claims.

I claim:

1. A computer diskette, for use in a computer having a disk drive slot and a disk drive write switch arm which controls the read-write-erase function by falling into a notch adjacent to one corner of said diskette, comprising a single, thin, flat circular plastic recording disk coated with magnetic material, a thin, flat envelope, having an enlarged central opening, enclosing and supporting said disk for rotary movement therein, and also having a top side and a bottom side sealed by a vertical edge, said envelope having a notch in one edge portion, adjacent to one corner thereof, adapted to be positioned with said computer disk drive write switch arm there onto, an insert slidably positioned within said one edge portion with engaging portions extending through said slot on both the top and bottom sides of said envelope for sliding said insert into and out of said slot when positioned in said drive slot, said insert having tabs projecting through said slot on the top and bottom sides of said envelope for grasping said insert so that the insert may be slidably engaged into and out of said edge slot, said insert capable of being slidably positioned to prevent movement of said switch arm to a selected position permitting the computer to write on the diskette.

2. The diskette according to claim 1 in which said envelope is of folded construction with a top layer and a back layer and having edge flaps bent from one layer over the other layer and bonded thereto said notch being on one edge free of edge flaps.

3. A computer diskette, for use in a computer having a disk drive slot and a disk drive write switch arm which controls the read-write-erase function by falling into a notch adjacent to one corner of said diskette, comprising a single, thin, flat circular plastic recording disk coated with magnetic material, a thin, flat envelope, having an enlarged central opening, enclosing and supporting said disk for rotary movement therein, and also having a top side and a bottom side sealed by a vertical edge, said envelope having a notch in one edge portion, adjacent to one corner thereof, adapted to be positioned with said computer disk drive write switch arm there onto, guiding means for positioning an insert over said notch in said one edge portion, said guiding means adapted to fit externally of said envelope, and an insert slidably positioned within said guiding means externally of said envelope on said one edge portion for covering and uncovering said notch, said insert capable of being slidably positioned to prevent movement of said switch arm to a selected position permitting the computer to write on the diskette.

4. The diskette according to claim 3 in which said envelope is of folded construction with a top layer and a back layer and having edge flaps bent from one layer over the other layer and bonded thereto, said notch being on one edge free of edge flaps.

5. The diskette according to claim 3 in which said guiding means is attached externally to said envelope extending from the top side to the bottom side of said envelope covering said notch allowing said insert to be movable to cover and uncover said notch.

* * * * *